United States Patent
Yokokura

(10) Patent No.: US 8,428,230 B2
(45) Date of Patent: Apr. 23, 2013

(54) COMMUNICATION APPARATUS PERFORMING COMMUNICATION VIA NETWORK USING PHONE NUMBER, CONTROL METHOD FOR THE SAME, AND STORAGE MEDIUM

(75) Inventor: Hidenori Yokokura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 296 days.

(21) Appl. No.: 12/971,264

(22) Filed: Dec. 17, 2010

(65) Prior Publication Data
US 2011/0158393 A1 Jun. 30, 2011

(30) Foreign Application Priority Data
Dec. 24, 2009 (JP) ................................. 2009-292790

(51) Int. Cl.
*H04M 11/00* (2006.01)
(52) U.S. Cl.
USPC .................................. 379/93.02; 379/100.01
(58) Field of Classification Search ............... 379/93.02, 379/100.01, 100.12, 93.07, 90.01; 358/1.15, 358/440; 370/352
See application file for complete search history.

(56) References Cited

U.S. PATENT DOCUMENTS

| | | | |
|---|---|---|---|
| 2005/0232229 A1 | 10/2005 | Miyamoto et al. | |
| 2007/0116250 A1* | 5/2007 | Stafford | 379/355.09 |
| 2007/0255799 A1* | 11/2007 | Forbes | 709/217 |
| 2007/0263803 A1* | 11/2007 | Chan | 379/93.02 |
| 2012/0236846 A1* | 9/2012 | Ku | 370/352 |

FOREIGN PATENT DOCUMENTS

JP 2005-269534 A 9/2005

* cited by examiner

*Primary Examiner* — Stella Woo
(74) *Attorney, Agent, or Firm* — Rossi, Kimms & McDowell LLP

(57) ABSTRACT

A communication apparatus that enables to appropriately perform IP filtering even when communication via a network is performed by a user inputting a destination phone number. An IP filter permits or rejects communication on the basis of a set IP address. An input unit inputs a phone number. An acquisition unit acquires an IP address corresponding to the phone number inputted by the input unit from a server connected to the network. A setting unit sets the IP filter so that communication using the IP address acquired by the acquisition unit is permitted.

7 Claims, 12 Drawing Sheets

FIG.4A

| IP ADDRESS | PHONE NUMBER |
|---|---|
| 172.24.176.1 | 050-1234-5678 |
| 172.24.176.50 | 050-2222-3333 |
| 172.24.176.51 | 050-4444-5555 |
| 172.24.177.10 | 050-8654-3210 |
| 172.24.177.100 | 050-3456-7890 |

FIG.4B

| DOMAIN NAME | URI(SIP) |
|---|---|
| 8.7.6.5.4.3.2.1.0.5.0.e164.arpa | NAPTR sip:05012345678@○×△.co.jp |
| 3.3.3.3.2.2.2.2.0.5.0.e164.arpa | NAPTR sip:05022223333@○×△.co.jp |
| 5.5.5.5.4.4.4.4.0.5.0.e164.arpa | NAPTR sip:05044445555@○×△.co.jp |
| 0.1.2.3.4.5.6.8.0.5.0.e164.arpa | NAPTR sip:05086543210@○×△.co.jp |
| 0.9.8.7.6.5.4.3.0.5.0.e164.arpa | NAPTR sip:05034567890@○×△.co.jp |

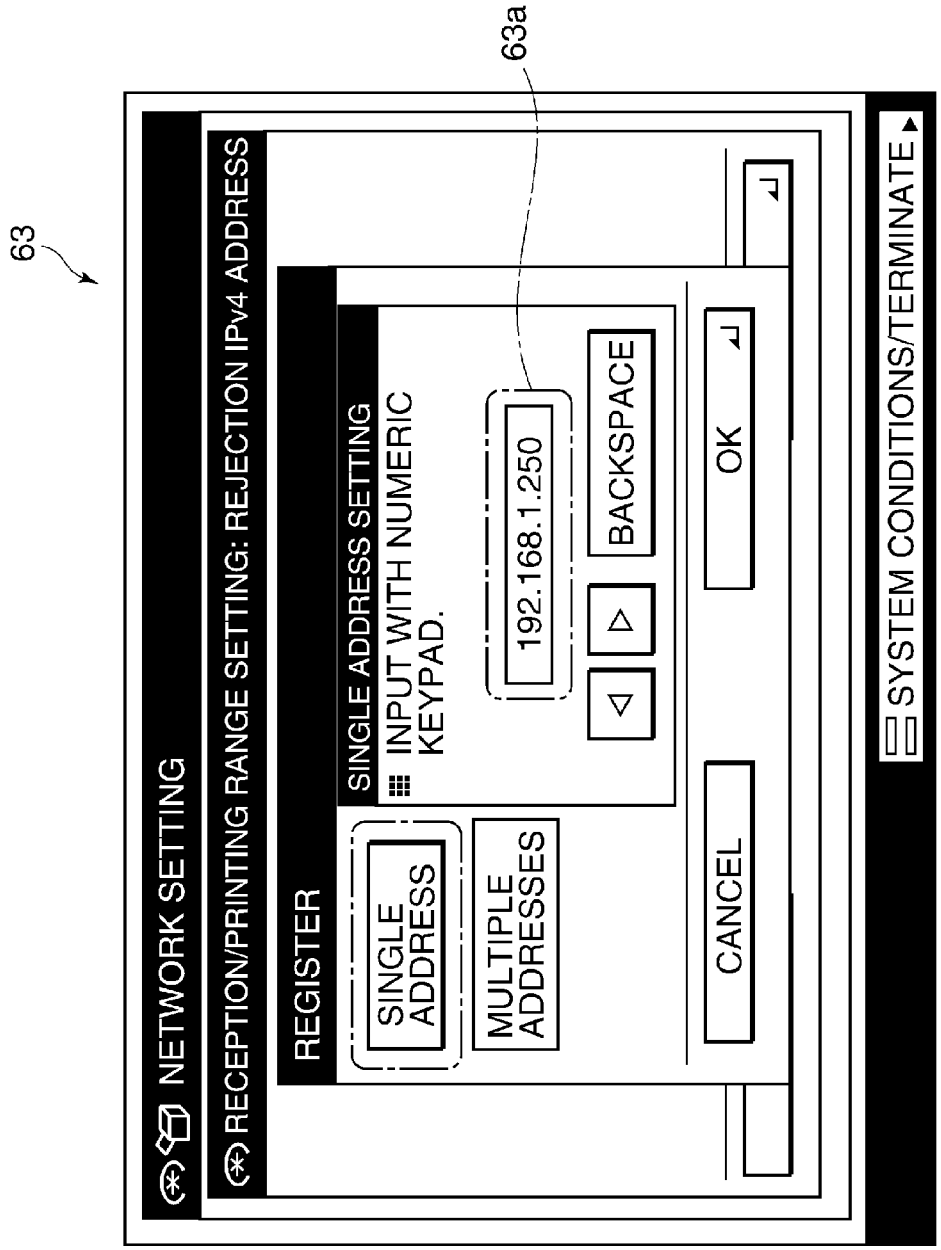

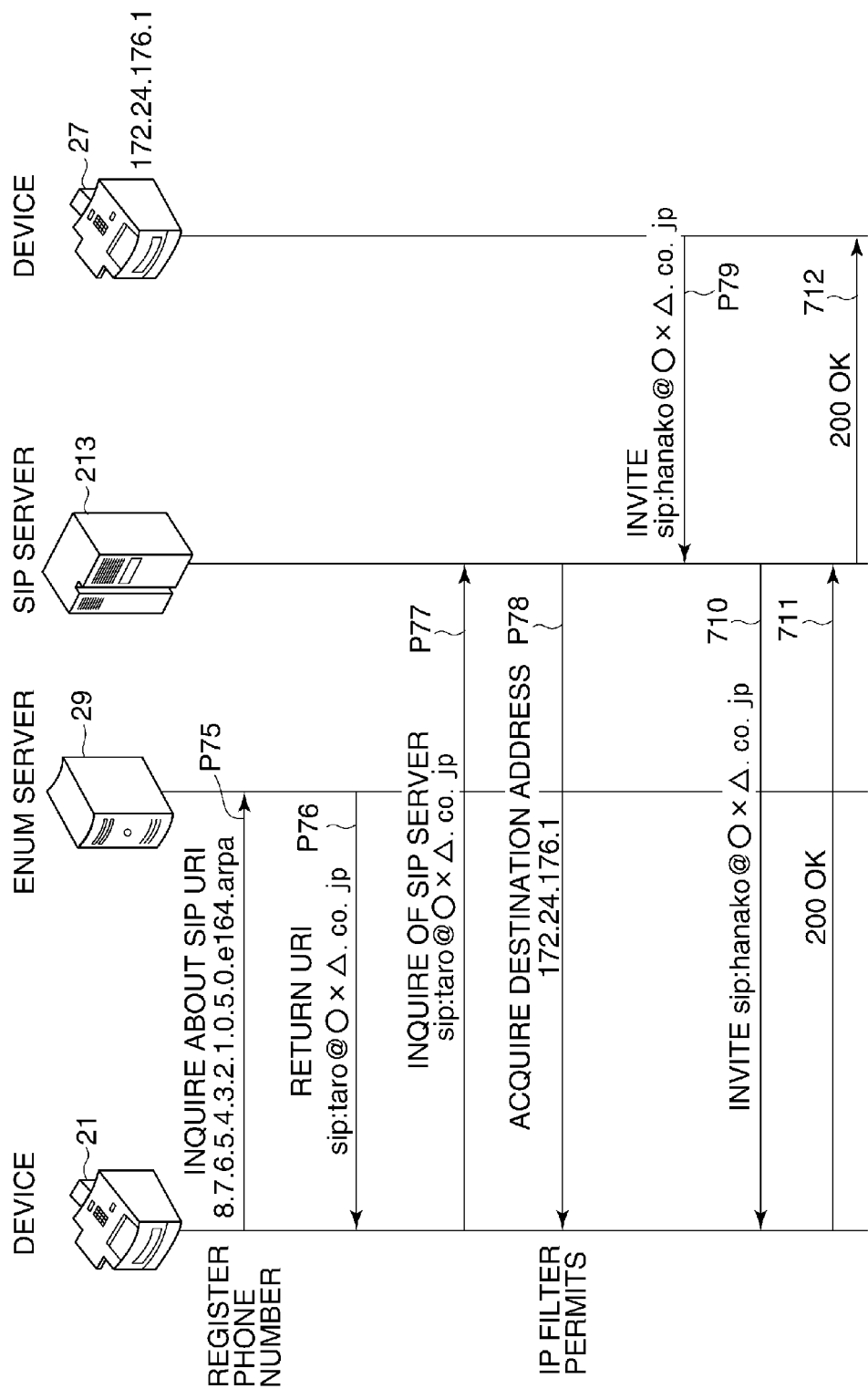

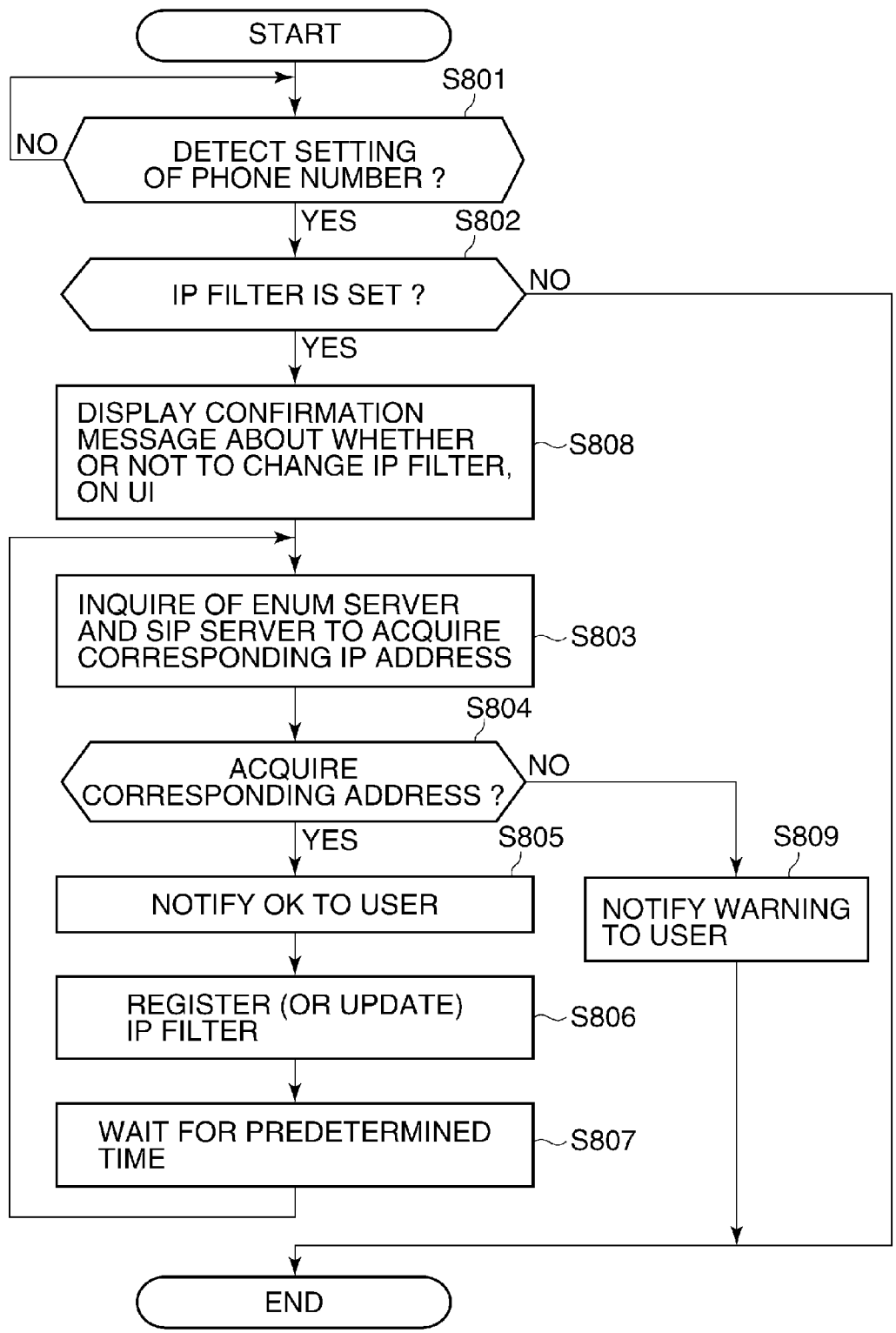

COMMUNICATION APPARATUS PERFORMING COMMUNICATION VIA NETWORK USING PHONE NUMBER, CONTROL METHOD FOR THE SAME, AND STORAGE MEDIUM

BACKGROUND OF THE INVENTION

1. Field of the Invention

The present invention relates to a communication apparatus performing communication via a network using a phone number, a control method therefor, and a computer-readable storage medium storing a program for causing a computer to implement the method.

2. Description of the Related Art

Recently, a next-generation network infrastructure, such as an NGN (Next Generation Network), is being established to convert analog networks to IP networks. In such a situation, communication by IP-FAX is started in intra-networks.

In IP-FAX, a protocol capable of acquiring an URI (Uniform Resource Identifier) from a phone number or SIP (Session Initiation Protocol) is defined. The demand for IP-FAX is expected to increase more and more in the future.

Meanwhile, in the field of network communication, it is an urgent necessity to take measures for enhancing security, and IP-FAX is not excepted. Therefore, it is required to perform incoming call permission/rejection by phone number in IP-FAX (a phone number filter) or appropriately set incoming call rejection/permission by an IP filter. For example, a system is proposed in which transmission and reception are permitted/rejected for each service on a per user basis at a SIP layer by a SIP-URI with the use of a server (see Japanese Laid-Open Patent Publication (Kokai) No. 2005-269534).

When a user inputs a destination phone number in a case of performing communication by IP-FAX using a communication apparatus, the communication apparatus acquires a SIP-URI from an ENUM server and receives an IP address from a SIP server to perform transmission. Therefore, the user generally does not recognize the IP address, and it is difficult to filter the IP address.

There may be a case where a user using IP-FAX unconsciously performs IP filtering, and there is a possibility that, even if reception is permitted by a phone number filter, IP-FAX communication is rejected due to incompatibility between the phone number filter and the IP filter.

SUMMARY OF THE INVENTION

The present invention provides a communication apparatus capable of appropriately performing IP filtering even when communication via a network is performed by a user inputting a destination phone number, a control method therefor, and a computer-readable storage medium storing a program for causing a computer to implement the method.

Accordingly, a first aspect of the present invention provides a communication apparatus capable of communicating with other communication apparatuses connected to a network, the communication apparatus comprising an IP filter configured to permit or reject communication on the basis of a set IP address, an input unit configured to input a phone number, an acquisition unit configured to acquire an IP address corresponding to the phone number inputted by the input unit from a server connected to the network, and a setting unit configured to set the IP filter so that communication using the IP address acquired by the acquisition unit is permitted.

Accordingly, a second aspect of the present invention provides a network system including a plurality of communication apparatuses and servers, each communication apparatus comprising an IP filter configured to permit or reject communication on the basis of a set IP address, an input unit configured to input a phone number, an acquisition unit configured to acquire an IP address corresponding to the phone number inputted by the input unit from the server, and a setting unit configured to set the IP filter so that communication using the IP address acquired by the acquisition unit is permitted.

Accordingly, a third aspect of the present invention provides a control method for a communication apparatus capable of communicating with other communication apparatuses connected to a network, the control method comprising an IP filtering step of permitting or rejecting communication on the basis of a set IP address, an input step of inputting a phone number, an acquisition step of acquiring an IP address corresponding to the phone number inputted in the input step from a server connected to the network, and a setting step of setting the IP filter so that communication using the IP address acquired in the acquisition step is permitted in the IP filtering step.

Accordingly, a fourth aspect of the present invention provides a computer-readable non-transitory storage medium storing a program for causing a computer to execute the control method for the communication apparatus as described above.

According to the present invention, it is possible to appropriately perform IP filtering even when communication via a network is performed by a user inputting a destination phone number.

Further features of the present invention will become apparent from the following description of exemplary embodiments (with reference to the attached drawings).

BRIEF DESCRIPTION OF THE DRAWINGS

FIG. 4A is a diagram showing an example of a management table stored and managed in a backup RAM in the devices, and FIG. 4B is a diagram showing an example of a management table stored and managed in a memory (not shown) in an ENUM server.

FIGS. 5A to 5D are diagrams showing an example of screens to be displayed on the display of an operation section in the devices.

FIG. 6 is a diagram showing a communication sequence among the devices, the ENUM server and a SIP server.

FIG. 7 is a flowchart showing an example of an IP filter setting process performed at a time of registering a phone number.

DESCRIPTION OF THE EMBODIMENTS

An embodiment of the present invention will be described below in detail with reference to the drawings.

Figure 1:
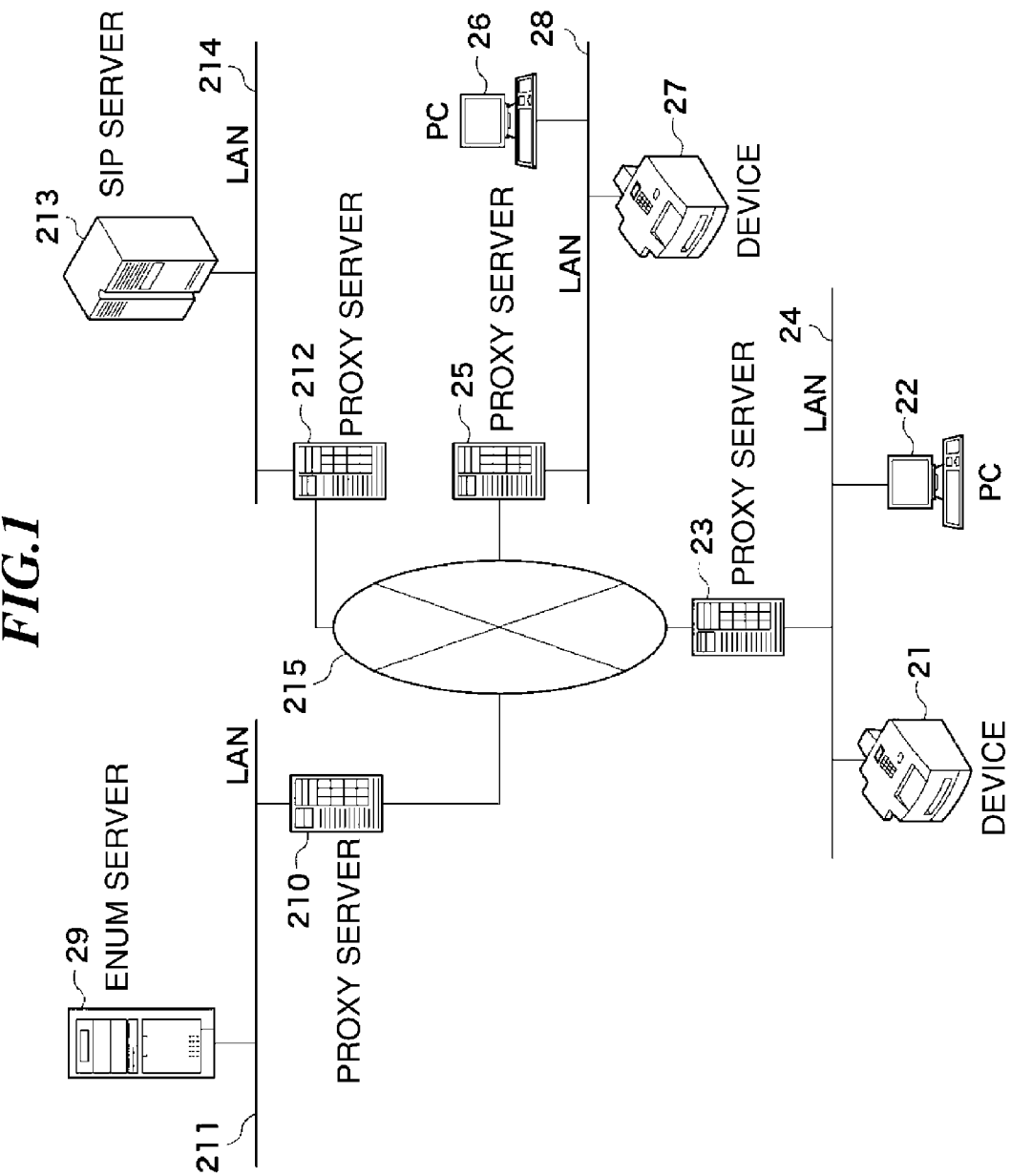
FIG. 1 is a diagram schematically showing a configuration example of a network system to which a communication apparatus according to an embodiment of the present invention is connected.

FIG. 1 is a diagram schematically showing a configuration example of a network system to which a communication apparatus according to the embodiment of the present invention is connected.

In FIG. 1, devices 21 and 27 are network devices capable of performing communication by IP-FAX, and they are configured, for example, by multifunctional peripherals. The device 21 is connected to a LAN 24, which is a local area network (LAN), and is connected to a PC 22 and a proxy server 23 via the LAN 24. On the other hand, the device 27 is connected to a LAN 28, and is connected to a PC 26 and a proxy server 25 via the LAN 28.

The PCs 22 and 26 are personal computers (PCs) capable of performing printing in the devices 21 and 27 and status monitoring of them. Proxy servers 23, 25, 210 and 212 are proxy servers for connecting LANs 24, 28, 211 and 214 to the Internet 215. The proxy server 210 is connected to an ENUM server 29 via the LAN 211. On the other hand, the proxy server 212 is connected to a SIP server 213 via the LAN 214.

The ENUM server 29 manages phone numbers and URIs (SIP) in the form shown in FIG. 4B and performs reverse URI (SIP) lookup from a domain name generated from a phone number and domain name lookup from a URI (SIP) on the basis of an inquiry from a device, a PC or the like. The SIP server 213 uses a SIP protocol to control voice or data communication by IP phone or IP-FAX. The SIP server 213 also performs search for an IP address from a URI (SIP) and search for an URI (SIP) from an IP address.

It should be noted that, though an embodiment in an Internet environment will be described in this embodiment, the Internet environment is not necessarily required. An environment in which a proxy server is arranged is also not necessarily required. The number of devices and the number of PCs are not limited to those in the shown example. Though the ENUM server and the SIP server are arranged on different LANs, they may be arranged on the same LAN. Furthermore, an environment is also possible in which the ENUM server and the SIP server are integrated so that one server provided with the functions of the two servers is arranged. Though an embodiment using a multifunctional peripheral, as an example of the device, will be described, the device is not limited thereto and may be a PC, a scanner, a printer or the like.

Figure 2:
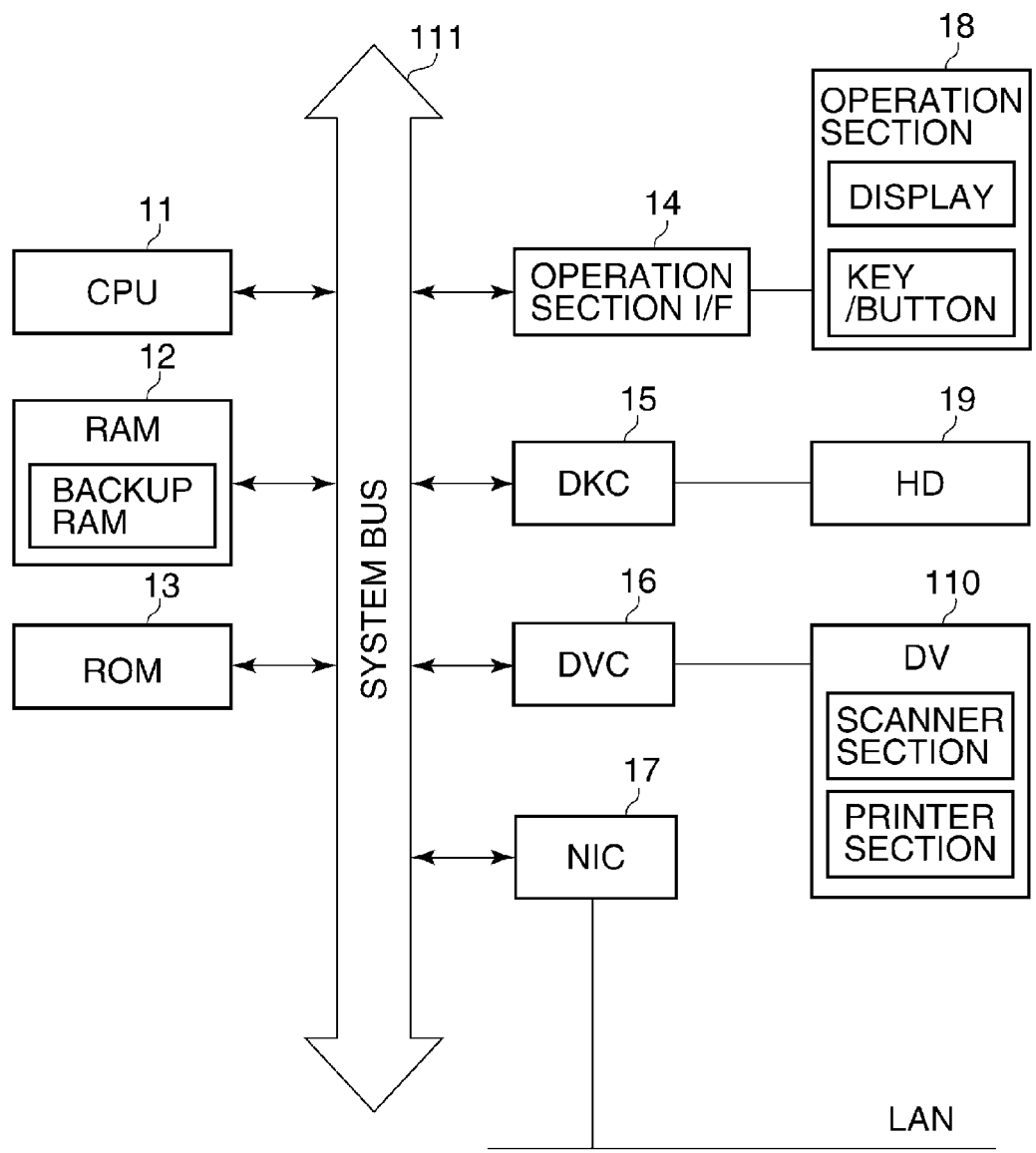
FIG. 2 is a block diagram schematically showing hardware configuration of devices in FIG. 1.

FIG. 2 is a block diagram schematically showing the hardware configuration of the devices 21 and 27 in FIG. 1.

In FIG. 2, a CPU 11 is a central processing unit which reads and executes a program stored in a ROM 13 and collectively controls sections connected via a system bus 111. A RAM 12 functions as a main memory, a work area and the like of the CPU 11. The RAM 12 functions as a backup RAM for storing device setting values for the IP filter, a management table of IP addresses corresponding to phone numbers to be described later, and the like.

An operation section I/F 14 controls acceptance of information inputted from an operation section 18 and display of information on the operation section 18. The operation section 18 includes keys, buttons and a display configured by a liquid crystal panel or the like. The display displays screen information (for example, various setting screens and contents set on each of the setting screens) inputted from the operation section I/F 14. A user can confirm IP-FAX or IP filter setting, an error display and the like using the operation section 18.

A disk controller (DKC) 15 controls a hard disk (HD) 19 storing image data and various user data. A device controller (DVC) 16 controls device sections (DVs) 110 which the device has, such as a printer section and a scanner section. A network interface card (NIC) 17 is connected to the ENUM server 29 and the SIP server 213 on the network via the LAN and performs inquiry about an IP address and IP-FAX communication.

It should be noted that the operation section 18 may be configured by a touch panel or the like in which virtual keys and a display are integrated. The hard disk (HD) may be a USB memory or any other storage device if data can be stored. The hard disk (HD) may not be mounted on the device. The device setting values for the IP filter, a management table of IP addresses corresponding to phone numbers and the like may be stored not in the backup RAM but in a different storage apparatus such as an HDD.

The PCs 22 and 26, the proxy servers 23, 25, 210 and 212, the ENUM server 29 and the SIP server 213 are information processing apparatuses provided with a CPU, a RAM, a ROM, an HD, an operation section such as a keyboard and a mouse, a display section such as a liquid crystal monitor, and the like. Description of the hardware configuration thereof will be omitted.

Figure 3:
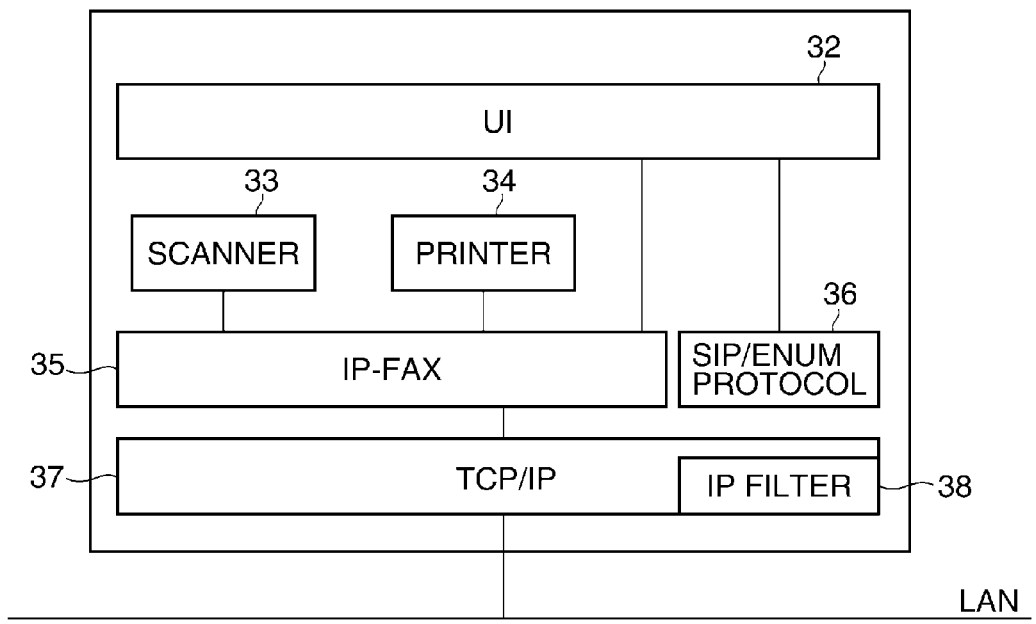
FIG. 3 is a block diagram schematically showing module configuration of the devices.

FIG. 3 is a block diagram schematically showing the module configuration of the device 21 and 27.

In FIG. 3, an UI 32 is a user interface (UI) module for controlling the operation section 18. A scanner 33 is a module for realizing a scanner function. A printer 34 is a module for realizing a printing function. An IP-FAX 35 is a module for performing communication by IP-FAX.

A SIP/ENUM protocol 36 is a module for handling a SIP/ENUM protocol. A TCP/IP 37 is a TCP/IP protocol stack and performs communication with the external SIP server 213, ENUM server 29 and other devices via the LAN. An IP filter 38 is a module capable of setting an IP filter through the UI 32.

It should be noted that, though the scanner section and the printer section are included as components because a multifunctional peripheral is used as the device for performing IP-FAX in this embodiment, the scanner section or the printer section may not be included in the case of a device performing IP communication other then IP-FAX.

FIGS. 4A and 4B are diagrams showing examples of management tables managed on the system in FIG. 1. FIG. 4A is a diagram showing an example of a management table stored and managed in the backup RAM in the devices. FIG. 4B is a diagram showing an example of a management table stored and managed in a memory (not shown) in the ENUM server.

The management table 40 shown in FIG. 4A is a management table for phone numbers registered for IP-FAX and IP addresses corresponding thereto. Under IP address 41, IP addresses acquired from the ENUM server 29 and the SIP server 213 by a sequence shown in FIG. 6 with the use of phone numbers are stored. The management table 40 is registered by an administrator in advance or dynamically updated. It should be noted that the telephone number may be any of an extension number and an outside line number. The IP address may be any of a global address and a local address. Though description will be made on an address based on IPv4, an address based on IPv6 is also possible. Though the IP addresses are held in the management table in this embodiment, it is also possible to acquire a corresponding IP address using the ENUM server and the SIP server each time.

A management table 50 shown in FIG. 4B is a management table for domain names and URIs (SIP) corresponding thereto. As described with reference to FIG. 2, the ENUM server 29 manages domain names and URIs (SIP) and performs reverse URI (SIP) lookup from a domain name generated from a telephone number and domain name lookup from a URI (SIP) on the basis of an inquiry from a device or the like. The management table 50 is registered by the administrator in advance or dynamically updated.

It should be noted that, though description will be made on a management table in the form shown in the example in this embodiment, the management table is not limited thereto if domain names and URIs (SIP) are associated.

Figure 5A:
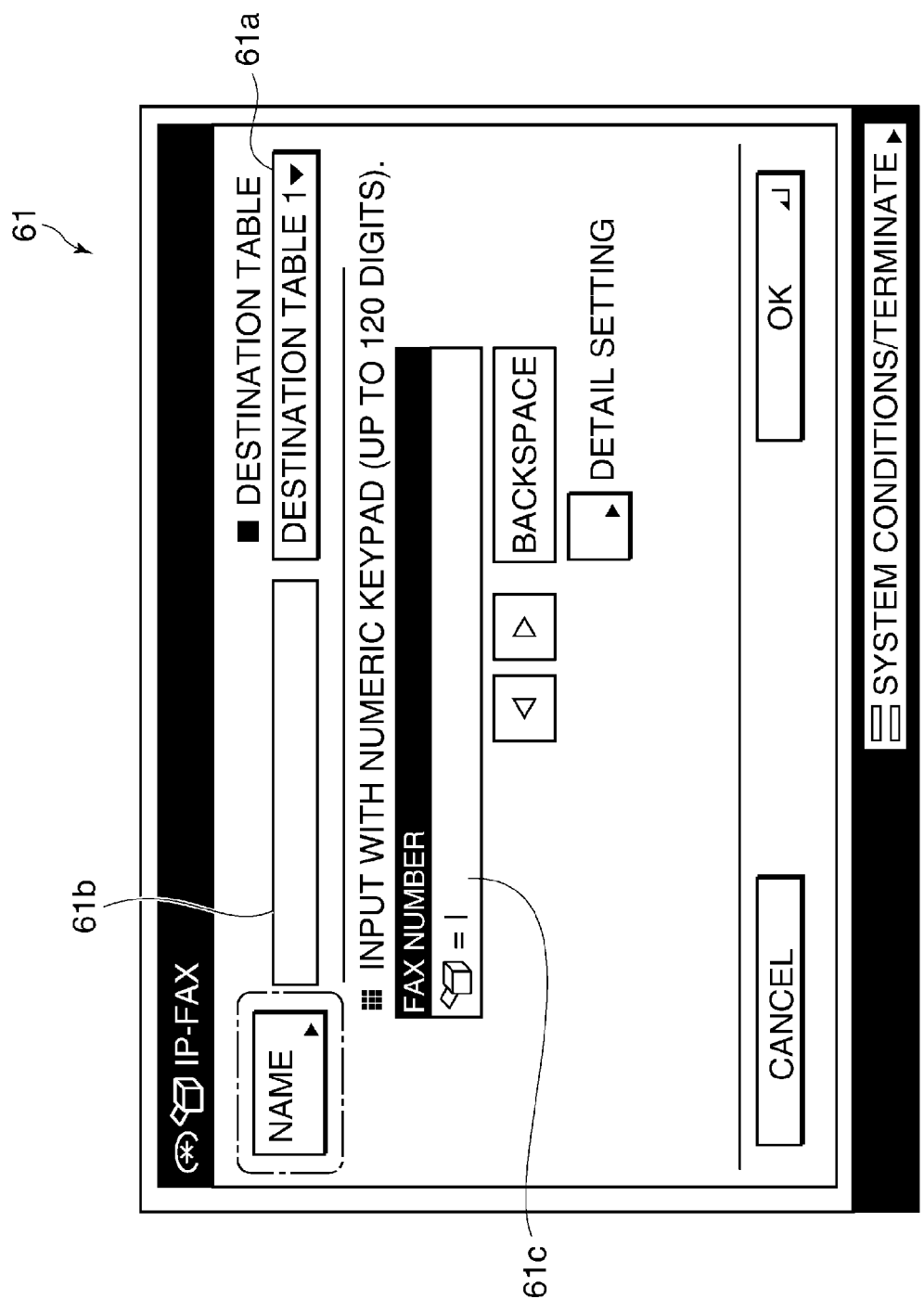
Figure 5B:
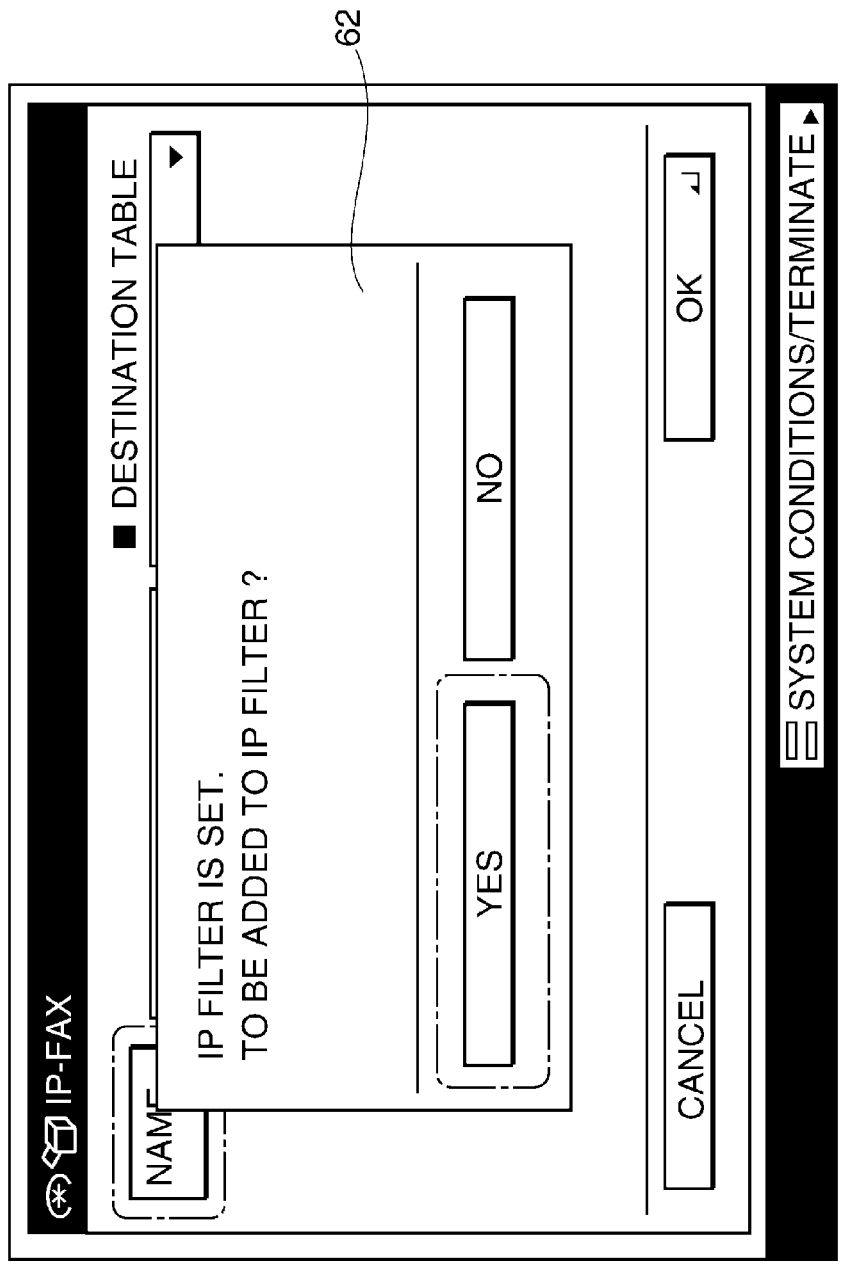

FIGS. 5A to 5D are diagrams showing examples of screens to be displayed on the display of the operation section 18 in the devices 21 and 27. FIGS. 5A and 5B are diagrams showing screen examples in a case where an IP filter is already set at the time of setting IP-FAX for an address book stored and managed in the devices.

On a screen 61 shown in FIG. 5A, the user selects, for example, "destination table 1" under destination table 61a, inputs a setting name into a name field 61b, and inputs a phone number (fax number) into a fax number field 61c. Then, the device displays a confirmation window 62 notifying that an IP filter is set, as shown in FIG. 5B, on the display of the operation section 18 and causes the user to select whether or not to set (or additionally set) the IP filter.

Figure 5D:
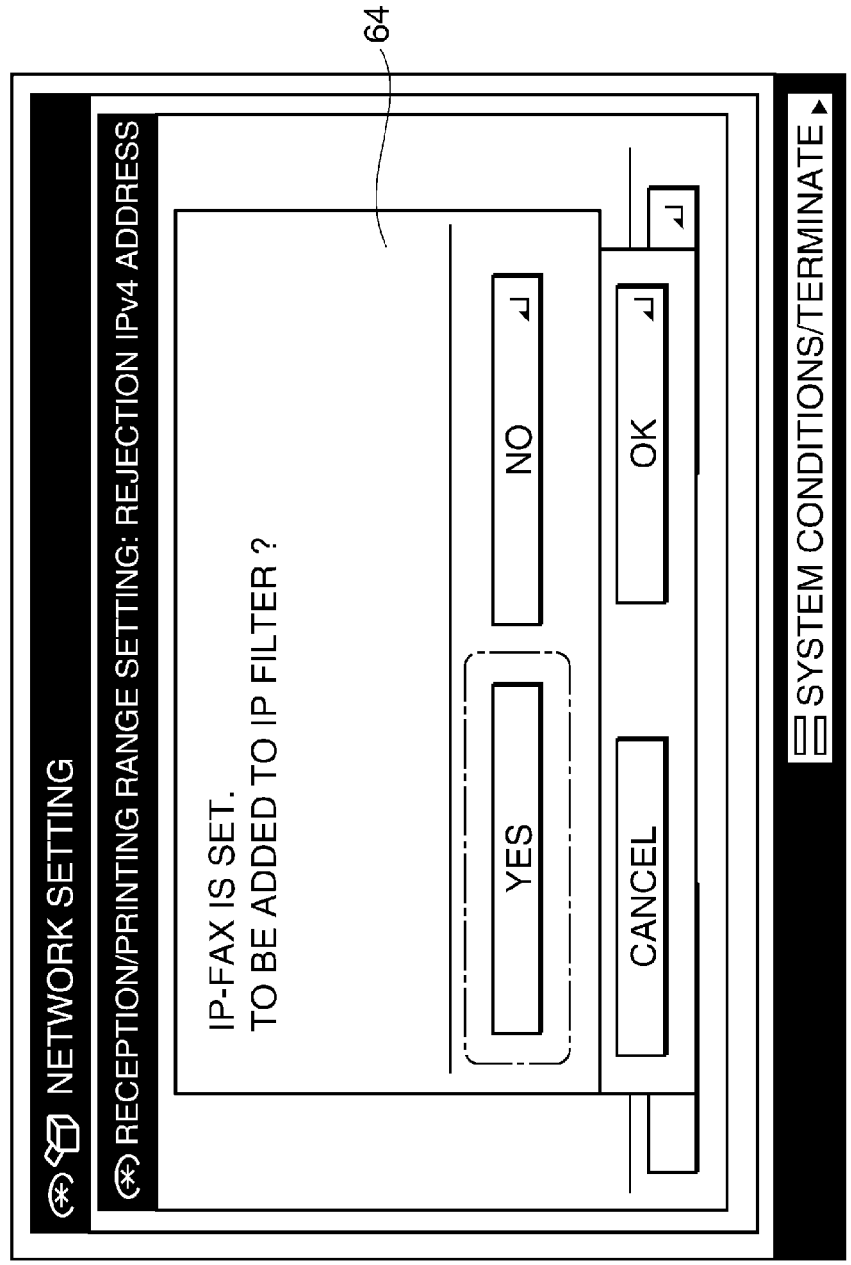

FIGS. 5C and 5D are diagrams showing screen examples in the case where IP-FAX is already set for the address book at the time of setting an IP filter.

On a screen 63 shown in FIG. 5C, the user inputs an IP address for which communication is to be rejected, into an address input field 63a. Then, the device displays a confirmation window 64 notifying that IP-FAX is set, as shown in FIG. 5D, on the display of the operation section 18 and causes the user to select whether or not to set IP-FAX.

It should be noted that, as for the registration of a phone number in the device described above, description was made on the assumption that the phone number is registered with the address book, but other registration methods using a one-touch key, reception transfer setting and the like are also possible. Similar registration to an IP filter may be performed at a time of performing IP-FAX to a destination. The description has been made on a registration method in the case where communication rejection for a single IP address is set as an IP filter. However, the same goes for a case where communication rejection is set for multiple IP addresses. Furthermore, though a description will be made on an address based on IPv4, an address based on IPv6 is also possible.

Next, a description will be made on a flow of communication by IP-FAX to be executed between the devices 21 and 27 in FIG. 1.

FIG. 6 is a diagram showing a communication sequence among the device 21, the ENUM server 29, the SIP server 213 and the destination device 27.

When registration of a phone number is performed on the screen 61 shown in FIG. 5A, the device 21 inquires of the ENUM server 29 about a URI (SIP) (process p75). In the shown example, a domain "8.7.6.5.4.3.2.1.0.5.0.e164.arpa" determined based on the registered phone number is used to inquire about the URI (SIP). Then, a URI (SIP) "sip:taro@○xΔ.co.jp" is returned from the ENUM server 29 to the device 21 as a response (process P76). Then, the device 21 inquires of the SIP server 213 about an IP address corresponding to the URI (SIP) "sip:taro@○xΔ.co.jp" (process P77). Then, the IP address "172.24.176.1" of the device 27, which is the destination, is acquired (process P78).

On the other hand, when the device 27 makes an INVITE request (process P79) indicating start of a communication procedure to the SIP server 213 when performing IP-FAX to the device 21, an INVITE request to the device 21 is made from the SIP server 213 (process P710).

Since the IP address "172.24.176.1" of the INVITE request issue source is an address permitted by the IP filter, the device 21 returns "200 OK" to the SIP server 213 (process P711). Then, the SIP server 213 returns "200 OK" to the device 27 (process P712). After that, the device 27 starts a normal IP-FAX procedure.

It should be noted that, though the description has been made on the sequence performed in the case of being permitted by the IP filter in this embodiment, an IP error is issued in process P711 in a case where the IP address of the INVITE request issue source is set as a rejected IP address by the IP filter. The ENUM server 29 and the SIP server 213 may be integrated, or other servers corresponding to these are also possible. A general sequence in which a phone number is acquired from an IP address can be also performed with the use of these systems.

Next, a description will be made on an IP-FAX IP filter setting process for the devices 21 and 27.

FIG. 7 is a flowchart showing an example of the IP-FAX IP filter setting process performed at a time of registering a telephone number.

In step S801, the CPU 11 in the device detects whether setting of a phone number has been performed by the user via the operation section 18 which is a UI. If setting of a phone number is detected (step S801: YES), the CPU 11 judges whether an IP filter is set or not, that is, whether an IP filter is already set or not (step S802). Specifically, the CPU 11 judges whether or not an IP filter is set in the backup RAM in the RAM 12.

As a result of the judgment in the step S802, if an IP filter is not set (step S802: NO), the CPU 11 immediately terminates the process. On the other hand, if an IP filter is set (step S802: YES), the CPU 11 displays a confirmation message about whether or not to change the IP filter on the operation section 18 (see FIG. 5B) (step S808) and proceeds to step S803. It should be noted that, if the user selects not to change the IP filter here, the CPU 11 terminates the process.

In step S803, the CPU 11 inquires of the ENUM server 29 and the SIP server 213 via the LAN to acquire an IP address corresponding to the set phone number. Next, in step S804, the CPU 11 judges whether or not the corresponding IP address could be acquired. As a result of the judgment, if the corresponding IP address could not be acquired, the CPU 11 displays information on the operation section 18 to the effect that the IP address could not be acquired to make a warning notification to the user, and terminates the process. On the other hand, if the corresponding IP address could be acquired, the CPU 11 proceeds to step S805.

In the step S805, the CPU 11 displays information on the operation section 18 to the effect that the IP address could be acquired (for example, displays "OK") to make an OK notification to the user. Next, in step S806, the CPU 11 registers the IP filter with the backup RAM 12. Here, if the IP address has been updated, the CPU 11 updates the IP filter set in the backup RAM 12. Next, in step S807, the CPU 11 waits for a predetermined time and returns to the step S803.

It should be noted that the judgment in the step S802 may be omitted. If a registered IP filter and an inputted or set phone number are incompatible with each other, an error may be notified to the user in the step S805, or the incompatibility of the IP filter may be eliminated in accordance with priority order set in advance. The waiting time in the step S807 may be of any length. The acquisition of the IP address in step S803 may be performed not after waiting for the predetermined time in the step S807 but when the device is booted up or powered off.

By the process described above, for example, when the user registers a phone number to be an IP-FAX communication counterpart, and the IP address of the communication counterpart is set as a rejected IP address of an IP filter, the setting of the IP filter can be automatically changed. That is, it is possible to automatically acquire an IP address corresponding to a registered phone number and automatically change the IP filter setting so that the acquired IP address is permitted by the IP filter (so that the acquired IP address is not rejected by the IP filter). Thereby, it is possible to resolve the inconvenience that, even though having registered a phone number to be an IP-FAX communication counterpart, the user cannot communicate with the communication counterpart.

—The description has been made on the process performed at the time of registering a communication counterpart phone number to be used for IP-FAX. Next, a description will be made on a process performed in a case where the user newly sets an IP filter when an IP-FAX phone number is already registered.

Figure 8:
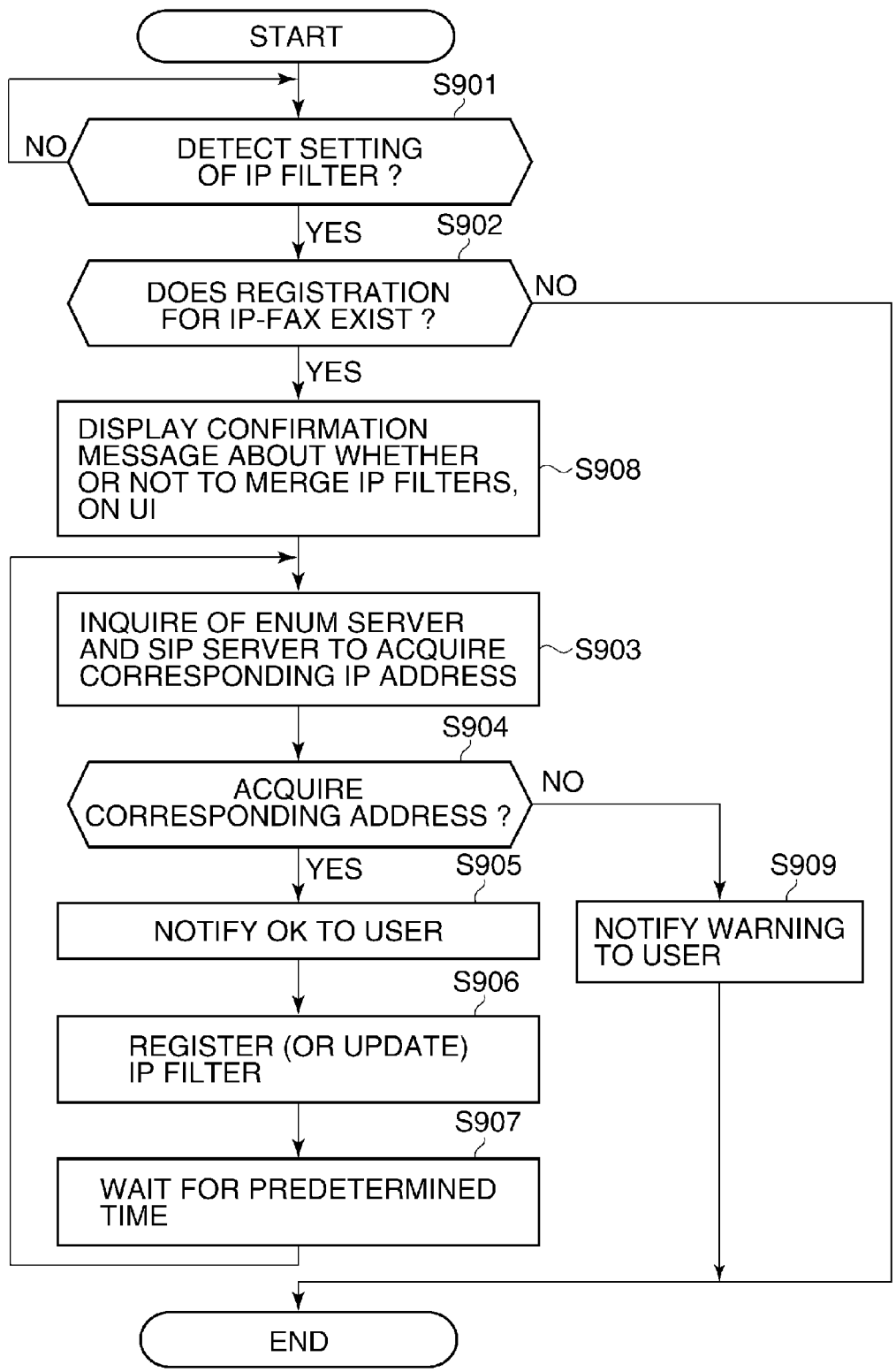
FIG. 8 is a flowchart showing an example of an IP filter setting process performed at a time of registering an IP filter.

FIG. 8 is a flowchart showing an example of an IP-FAX IP filter setting process performed at a time of registering an IP filter.

In step S901, the CPU 11 in the device detects whether or not setting of an IP filter has been performed by the user via the operation section 18. If setting of an IP filter is detected (step S901: YES), the CPU 11 judges whether or not a phone number to be used for IP-FAX is registered or not (step S902). Specifically, the CPU 11 judges whether or not a phone number for IP-FAX is registered with the backup RAM in the RAM 12.

As a result of the judgment in step S902, if a phone number for IP-FAX is not registered (step S902: NO), the CPU 11 immediately terminates the process. On the other hand, if a phone number for IP-FAX is registered (step S902: YES), the CPU 11 displays a confirmation message about whether or not to change the IP filter (for example, merging) on the operation section 18 (see FIG. 5D) (step S908). Then, the CPU 11 proceeds to step S903. It should be noted that, if the user selects not to change the IP filter here, the CPU 11 terminates the process.

In the step S903, the CPU 11 inquires of the ENUM server 29 and the SIP server 213 via the LAN to acquire an IP address corresponding to the phone number registered for IP-FAX. Next, in step S904, the CPU 11 judges whether or not the corresponding IP address could be acquired. As a result of the judgment, if the corresponding IP address could not be acquired, the CPU 11 displays information on the operation section 18 to the effect that the IP address could not be acquired to make a warning notification to the user, and terminates the process. On the other hand, if the corresponding IP address could be acquired, the CPU 11 proceeds to step S905.

In the step S905, the CPU 11 displays information on the operation section 18 to the effect that the IP address could be acquired (for example, displays "OK") to make an OK notification to the user. Next, in step S906, the CPU 11 registers the IP filter with the backup RAM 12. Here, if the IP address has been updated, the CPU 11 updates the IP filter set in the backup RAM 12. Next, in step S907, the CPU 11 waits for a predetermined time and returns to the step S903.

It should be noted that, if the set IP filter and the registered phone number are incompatible with each other, an error may be notified to the user in the step S905, or the incompatibility of the IP filter may be eliminated in accordance with priority order set in advance. The waiting time in the step S907 may be of any length. The acquisition of the IP address in the step S903 may be performed at predetermined time intervals or when the device is booted up or powered off. In the step S903, it is possible to use the IP address of a newly set IP filter to perform reverse lookup in the SIP server and the ENUM server, and display an appropriate phone number on the UI if it can be detected.

By the process described above, for example, when the user performs setting of an IP address rejected by an IP filter, and a communication counterpart phone number is registered which corresponds to the IP address set as a rejection target, the setting of the IP filter can be automatically changed. That is, it is possible to automatically acquire an IP address corresponding to the registered phone number and automatically change the IP filter setting detected in the step S901 so that the acquired IP address is permitted by the IP filter (so that the acquired IP address is not rejected by the IP filter). Thereby, it is possible to resolve the inconvenience that, even though having registered a phone number to be an IP-FAX communication counterpart, the user cannot communicate with the communication counterpart.

It should be noted that the "registration of a phone number" described above is assumed as registering a communication counterpart phone number with the address book stored in the hard disk (HD) 19 and, thereby, setting the registered phone number as a permission target of a phone number filter. In this case, an outgoing call with an unregistered phone number as a destination or an incoming call with an unregistered phone number as a source is rejected.

However, in a case where a phone number filtering function is not provided or in a case a phone number filtering function is not used, the process described above may be performed. That is, even in a case of simply registering a communication counterpart phone number with the address book, a communication error occurs at a time of performing origination with reference to the address book if the content of the registration is incompatible with IP filter setting. In comparison, if the process described above is executed at a time of registering a phone number with the address book, such a problem can be avoided.

Next, a description will be made on an operation process of the device in a case where an incoming call is rejected by an IP filter.

Figure 9:
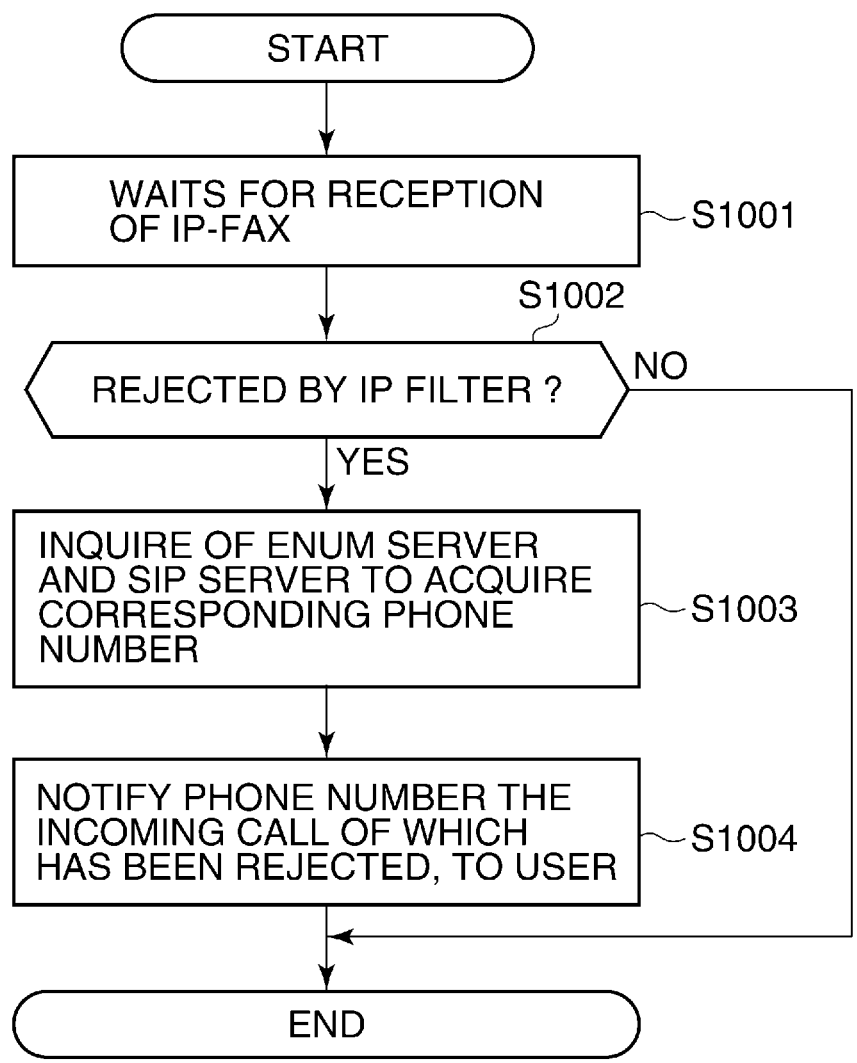
FIG. 9 is a flowchart showing an example of an operation process performed at a time of rejecting an incoming call by an IP filter.

FIG. 9 is a flowchart showing an example of an operation process performed when an incoming call is rejected by an IP filter.

In step S1001, the CPU 11 waits for reception of communication by IP-FAX. If communication is received, the CPU 11 proceeds to step S1002. In the step S1002, the CPU 11 detects whether or not the incoming call is rejected by an IP filter. Then, if the incoming call is not rejected by the IP filter, the CPU 11 terminates the process (that is, the CPU 11 performs a normal incoming call process and performs communication with the call-source counterpart apparatus). On the other hand, if the incoming call is rejected by the IP filter, the CPU 11 proceeds to step S1003.

In step S1003, the CPU 11 inquires of the ENUM server 29 and the SIP server 213 via the LAN to acquire a phone number corresponding to the IP address of the incoming call which has been rejected by the IP filter. Next, in step S1004, the CPU 11 displays the phone number of the incoming call which has been rejected on the operation section 18 to notify it to the user, and terminates the process. It should be noted that the notification to the user may be performed by means such as a mail, in addition to the notification on the UI.

By the process described above, in a case where, even though an incoming call using IP-FAX arrives from a counterpart apparatus, the incoming call is rejected because of IP filter setting, the phone number of the counterpart apparatus can be notified to the user. Thereby, the user who has received the notification knows that it is necessary to change the IP filter setting.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority the benefit of Japanese Patent Application No.2009-292790 filed Dec. 24, 2009, which is hereby incorporated by reference herein in its entirety.

What is claimed is:

1. A communication apparatus capable of communicating with other communication apparatuses connected to a network, the communication apparatus comprising:
   an IP filter configured to permit or reject communication on the basis of a set IP address;
   an input unit configured to input a phone number;
   an acquisition unit configured to acquire an IP address corresponding to the phone number inputted by said input unit from a server connected to the network; and
   a setting unit configured to set said IP filter so that communication using the IP address acquired by said acquisition unit is permitted.

2. The communication apparatus according to claim 1, wherein said acquisition unit acquires the IP address corresponding to the inputted phone number at predetermined time intervals or when the communication apparatus is booted up.

3. The communication apparatus according to claim 1, further comprising:
   a judgment unit configured to judge whether or not said IP filter is set or not; and
   a display unit configured to display a confirmation message about whether or not to change said IP filter in a case where, when the phone number is inputted by said input unit, it is judged by said judgment unit that said IP filter is already set.

4. The communication apparatus according to claim 1, wherein, if said set IP filter and the phone number inputted by said input unit are incompatible with each other, said setting unit notifies an error to a user, or eliminates the incompatibility and sets said IP filter in accordance with a priority order set in advance.

5. A network system including a plurality of communication apparatuses and servers, each communication apparatus comprising:
   an IP filter configured to permit or reject communication on the basis of a set IP address;
   an input unit configured to input a phone number;
   an acquisition unit configured to acquire an IP address corresponding to the phone number inputted by said input unit from the server; and
   a setting unit configured to set said IP filter so that communication using the IP address acquired by said acquisition unit is permitted.

6. A control method for a communication apparatus capable of communicating with other communication apparatuses connected to a network, the control method comprising:
   an IP filtering step of permitting or rejecting communication on the basis of a set IP address;
   an input step of inputting a phone number;
   an acquisition step of acquiring an IP address corresponding to the phone number inputted in said input step from a server connected to the network; and
   a setting step of setting the IP filter so that communication using the IP address acquired in said acquisition step is permitted in said IP filtering step.

7. A computer-readable non-transitory storage medium storing a program for causing a computer to execute the control method for the communication apparatus according to claim 6.

* * * * *